(12) United States Patent
Srinivasan et al.

(10) Patent No.: US 7,741,406 B2
(45) Date of Patent: Jun. 22, 2010

(54) PHENOL-FORMALDEHYDE RESIN HAVING LOW CONCENTRATION OF TETRADIMER

(75) Inventors: Ramji Srinivasan, Alpharetta, GA (US); Kim Tutin, East Point, GA (US); James Knight, Conyers, GA (US); Paul Baxter, Conyers, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 776 days.

(21) Appl. No.: 11/531,518

(22) Filed: Sep. 13, 2006

(65) Prior Publication Data

US 2008/0064799 A1 Mar. 13, 2008

(51) Int. Cl.
*C08G 14/06* (2006.01)
(52) U.S. Cl. .................. 524/594; 524/595; 524/596; 528/129; 528/137; 528/143
(58) Field of Classification Search .......... 524/594.595, 524/596; 528/129, 137, 143
See application file for complete search history.

(56) References Cited

U.S. PATENT DOCUMENTS

| | | | |
|---|---|---|---|
| 3,328,354 A | 6/1967 | Dietrick | |
| 3,872,056 A | 3/1975 | Daubach et ai. | |
| 4,028,367 A | 6/1977 | Higginbottom | |
| 4,608,408 A | 8/1986 | Hood et al. | |
| 4,757,108 A | 7/1988 | Walisser | |
| 4,960,826 A | 10/1990 | Walisser | |
| 5,371,140 A | 12/1994 | Parks | |
| 5,530,048 A | 6/1996 | McDonald et al. | |
| 5,623,032 A | 4/1997 | Wu | |
| 5,795,934 A | 8/1998 | Parks | |
| 5,864,003 A | 1/1999 | Qureshi et al. | |
| 5,952,440 A | 9/1999 | Walisser | |
| 6,028,133 A | 2/2000 | Peek et al. | |
| 6,114,491 A | 9/2000 | Dupre et al. | |
| 6,194,512 B1 | 2/2001 | Chen et al. | |
| 6,245,438 B1 | 6/2001 | Dupre et al. | |
| 6,369,171 B2 | 4/2002 | Dupre et al. | |
| 6,379,814 B1 | 4/2002 | Dupre et al. | |
| 6,472,469 B2 | 10/2002 | Bristol et al. | |
| 6,608,162 B1 | 8/2003 | Chiu et al. | |
| 6,646,094 B1 | 11/2003 | Malhotra et al. | |
| 6,706,809 B2 | 3/2004 | Tutin et al. | |
| 6,794,034 B2 | 9/2004 | Ogawa et al. | |
| 6,861,099 B2 | 3/2005 | Gabrielson et al. | |
| 6,881,814 B2 | 4/2005 | Tang et al. | |
| 6,906,130 B2 | 6/2005 | Tutin et al. | |
| 2003/0166825 A1 | 9/2003 | Aiba et al. | |
| 2004/0082713 A1 | 4/2004 | Tutin et al. | |

FOREIGN PATENT DOCUMENTS

| | | |
|---|---|---|
| DE | 102004062456 A1 | 6/2006 |
| EP | 0282910 | 9/1988 |
| EP | 1424432 A1 | 6/2004 |
| WO | WO 9623014 | 8/1996 |

OTHER PUBLICATIONS

PCT Search Report.
PCT International Search Report and Written Opinion of the International Searching Authority for PCT/US2007/077347, mailed Dec. 12, 2007, 8 pages.

*Primary Examiner*—Edward J Cain
(74) *Attorney, Agent, or Firm*—Michael S. Kerns

(57) ABSTRACT

A phenol-formaldehyde resin, having a low concentration of tetradimer, making the resin suitable for preparing a binder composition for making non-woven fiber products, such as fiberglass insulation, prepared by reacting phenol and formaldehyde in the presence of a sulfite source.

29 Claims, No Drawings

PHENOL-FORMALDEHYDE RESIN HAVING LOW CONCENTRATION OF TETRADIMER

FIELD OF THE INVENTION

The present invention relates to a phenol-formaldehyde resin having a low concentration of tetradimer, thus making the resin particularly suitable for preparing a binder composition useful for making non-woven fiber products, such as fiberglass insulation.

BACKGROUND OF THE INVENTION

Phenol-formaldehyde (PF) resins and especially PF resins extended with urea (PFU) find widespread use as adhesives and bonding agents for making a wide variety of products, especially non-woven fiber products such as fiberglass insulation.

Indeed, PF and PUF resins have been the mainstays of fiberglass insulation binder technology over the past several years. Such resins are relatively inexpensive and provide cured fiberglass insulation products with excellent physical properties.

One of the complications presented by using conventional PF and PFU resins in formulating binder compositions from such resins is the presence of bis (4-hydroxy-3,5-dimethylolphenol)methane (also known as tetradimer) in the resin compositions. Tetradimer is generally present in conventional PF resins at a concentration of about 10 to 18% by weight (adjusted for a typical resin concentration of 50% solids).

The problems presented by the presence of tetradimer in PF and PUF resins are well documented. When these resins are diluted with water during the preparation of a binder composition (particularly when the formaldehyde content is reduced below about 2-3 weight percent), the tetradimer is prone to precipitation in tanks and piping and posses a plugging problem in binder application equipment, such as sprayers. Consequently, as efforts to reduce formaldehyde concentration and accordingly formaldehyde emissions in such binders increase, problems created by tetradimer precipitation are exacerbated. Unfortunately, the tetradimer crystal phase is very difficult to re-dissolve and often must be removed and discarded, increasing production expenses and decreasing binder efficiency. Thus, care must be taken to accommodate the presence of tetradimer in these resins to avoid production down time for cleaning the un-welcomed precipitate.

The prior art has sought ways of minimizing tetradimer production during the synthesis of PF resins. Higginbottom U.S. Pat. No. 4,028,367, for example, describes an aqueous resole resin composition that is purportedly stable with respect to the unwanted crystallization of tetradimer and also is purportedly low in free phenol (P) and free formaldehyde (F).

According to the Higginbottom patent, the aqueous resole composition is prepared using a complicated two-step process. First, a molar excess of phenol (P) is reacted with formaldehyde (F) (1 mole phenol with 0.05 to 0.3 mole formaldehyde) under an acidic condition sufficient to form a novolac resin. Thereafter, the resin is neutralized and then made alkaline as additional formaldehyde is added (broadly described as 1.75 to 3.5 moles per mole of original phenol), and reacted under basic conditions to yield the resole resin. The level of free formaldehyde in the resole resin is then reduced further by adding a formaldehyde scavenger near the end of the resole reaction in an amount of 0.5 to 1.5 mole equivalents per mole of free formaldehyde. Urea is one of several scavenger options disclosed.

The Higginbottom patent alleges that that the sizable population of 2,2'- and 2,4'-dihydroxydiphenylmethanes that is produced, along with a minor amount of the tetradimer, helps to suppress crystallization of the tetradimer and allows the level of free (unreacted) formaldehyde to be reduced almost completely in the resole, often through the use of a formaldehyde scavenger.

The resole resin obtained by the process of the Higginbottom patent is said to have a water tolerance in the range of 100 to 800 percent, i.e., haze occurs when an amount of water from 1 to up to about 8 times the amount (mass) of resole is added to the resin. This latter property constitutes an additional impediment to the widespread use of the Higginbottom resole resin for making fiberglass insulation as higher levels of dilution are generally preferred when making a fiber mat binder. Indeed, it is preferred that the resin exhibit an infinite water dilutability, which is considered to be a dilution ratio of at least 50 parts water to one part resin.

U.S. Pat. No. 4,757,108 purports to produce a PFU resin of improved storage stability against tetradimer precipitation by using a carefully controlled acidification reaction to form urea-formaldehyde (UF) polymers of limited molecular weight that are fully water soluble. With the pH initially on the alkaline side, urea is added to the PF resole resin for reaction with free formaldehyde present. The pH is then adjusted to be acidic and is maintained in an acidic pH range for a limited time at a slightly elevated temperature. At the end of the limited time, the resin solution is neutralized, allowed to cool, and is then ready for storage. The UF polymers so-formed allegedly inhibit the crystallization of tetradimer.

U.S. Pat. No. 5,623,032 also purports to produce a PF resin of improved storage stability against tetradimer precipitation by using one member of a particular class of tertiary amine alcohols as a catalyst.

U.S. Pat. No. 6,881,814 alleges that the addition of a small amount of sodium tetraborate early in the preparation of a PF resin reduces the amount of tetradimer formed and improves the stability of both the base resin and its pre-react (PFU).

U.S. Pat. No. 6,906,130 also reportedly produces a resin low in tetradimer concentration. Again, a two stage process is described in which a novolac resin first is prepared at a low F:P mole ratio (0.01:1 to 0.3:1) preferably using a strong acid catalyst. Following neutralization, a conventional alkaline catalyst then is added and additional formaldehyde is added thereafter as quickly as possible to the reaction solution while maintaining the temperature at or below 55° C. A key feature of the invention is that the temperature during the resole reaction is limited to a temperature below about 60° C., in order to make a low molecular weight resin and obtain maximum methylolation of the phenolic core, rather than causing linking condensation reactions that build molecular weight. The resulting resin has a large free formaldehyde concentration, which then is reduced by use of a formaldehyde scavenger, preferably urea, before using the resin for formulating a binder composition.

Notwithstanding these approaches, there remains a need for newer, less complicated methods for addressing the problems presented by tetradimer formation when preparing a phenol-formaldehyde resin suitable for making a binder composition for non-woven fiber products, such as fiberglass insulation.

DETAILED DESCRIPTION OF THE INVENTION

The present invention is directed to a phenol-formaldehyde resin having a reduced concentration of tetradimer that results from reacting an aqueous mixture of a phenol component (P) with a molar excess of formaldehyde (F) under an alkaline condition in the presence of a sulfite source, such as an alkali metal sulfite, preferably sodium sulfite.

By providing a PF resin of low tetradimer content, the invention also allows for the preparation of a urea-extended PF resin, or PFU resin, of improved stability and low free formaldehyde i.e. a PFU resin that resists tetradimer precipitation. As a result of the enhanced resin stability, the PFU resin can be formulated by the resin supplier, instead of by the fiberglass insulation customer, making it is no longer necessary for the fiberglass manufacturer to have the equipment on site for making the PFU resin. The time (and storage capacity) that would otherwise have to be allocated at the fiber mat manufacturing plant for PFU production also is significantly reduced.

According to the present invention, the phenol-formaldehyde resin of a low tetradimer concentration is prepared by conducting the methylolation and condensation reactions between a molar excess of formaldehyde and the phenol component in the presence of a sulfate source. One suitable sulfite source for use in the present invention is alkali metal sulfites, such as sodium sulfite, potassium sulfite and lithium sulfite. Of these, sodium sulfite is usually preferred based on its availability and performance.

In an aqueous environment and in the presence of formaldehyde, the alkali metal sulfites have the ability to establish a sufficient level of alkalinity (i.e., a proper pH) in the reaction mixture for promoting the methylolation and condensation reactions that produce PF resins. In doing so, the alkali metal sulfites react with formaldehyde. One product of that reaction, the alkali metal (e.g., sodium) salt of hydroxymethyl sulfonic acid, alters the course of the methylolation and condensation reactions that occur in the reaction mixture in a way to reduce the generation of the tetradimer, and to generate other reactive phenolic species having an enhanced aqueous solubility. In this way, the tendency of undesired precipitation of resin species that is common in conventional PF resins prepared for use as binders for non-woven fibrous mats is reduced or eliminated. A by-product of that reaction is an alkali metal (e.g., sodium) hydroxide, which serves to establish the alkaline conditions conducive for the methylolation and condensation reactions that yield the desired PF resin.

Alkali metal bisulfites and metabisulfites also can be used as a sulfite source in the present invention. When used, such materials must be supplied in a sufficient amount to provide the same (i.e., an equivalent) level of $SO_3$ relative to phenol as describe below in connection with the alkali metal sulfites. In addition, since these materials do not react in the same way with formaldehyde to increase the alkalinity of the aqueous reaction mixture by generating an equivalent of free hydroxyl, it is necessary to add a source of alkalinity separately to the reaction mixture, typically as an alkali metal hydroxide such as sodium, potassium or lithium hydroxide. However, in the broad practice of the present invention other sources of alkalinity generally used in connection with the synthesis of PF resins can alternatively be used for establishing a suitable level of alkalinity during the resin synthesis, including alkaline earth metal hydroxides, such as calcium hydroxide and barium hydroxide, and organic bases such as trimethylamine, triethylamine and dimethyl ethanolamine to name a few.

Indeed, as long as the proper level of alkalinity is established for the synthesis of the PEF resole resin, hydroxymethyl sulfonic acid or a salt thereof also could be used directly as the sulfite source, in lieu of the alkali metal sulfite. As a result, in the broad practice of the present invention the term "sulfite source" embraces any sulfite source that results in the presence of the same sulfite-reaction adducts in the PF resin that one obtains when using sodium sulfite and thus would include the use of an alkali metal sulfite, bisulfite, or metabisulfite, as well as the use of hydroxymethyl sulfonic acid or more appropriately one of its salts.

In preparing a PF resole resin according to the present invention formaldehyde and the phenol component are reacted in an aqueous mixture under alkaline conditions using known techniques and equipment.

The formaldehyde can be provided in the form of an aqueous formalin solution, generally having from about 30-55 percent by weight formaldehyde, although other forms of formaldehyde known to those skilled in the art can also be used. A minor amount of another reactive aldehyde may also be substituted for formaldehyde to produce the aqueous reaction mixture. Examples of other reactive aldehydes that can be used in this way are acetaldehyde, propionaldehyde, furfuraldehyde, glutaraldehyde, and benzaldehyde. Again, for reasons of cost and performance, formaldehyde is especially preferred as the sole reactant.

The phenol component used to prepare the PF resin includes those phenols normally used for making phenolic resole resins. In addition to phenol itself, other hydroxy-functional aromatic compounds may also be employed, or used for phenol. Examples of substituted phenols tat can be used include alkyl-substituted phenols, such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols such as catechol, resorcinol, hydroquinone, bisphenol A and bisphenol F also can be similarly employed. In particular, the phenol component can be selected from the group consisting of: phenol; alkyl-substituted phenols, such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; halogen-substituted phenols such as p-chlorophenol; catechol, hydroquinone, bisphenol A and bisphenol F. In a preferred aspect of the present invention above 95% of the phenol component comprises phenol (monohydroxybenzene). Indeed, using phenol alone is generally preferred for reasons of cost and performance.

Suitable resins are made by using a molar excess of formaldehyde (along with any other reactive aldehyde component) relative to the phenol component, e.g., phenol. Preferably, the molar ratio of formaldehyde to phenol component (F:P) in the synthesized resin is within the range of 1.1:1 to 6:1 and more usually is in the range of 1.5:1 to 4:1. When synthesized, such resins typically contain a low level of residual "free" phenol component and a much larger amount of residual "free," i.e., unreacted formaldehyde. Prior to any formaldehyde scavenging, the PF resin of the present invention is characterized by a free formaldehyde content of 0.2 to 18 percent by weight of the aqueous resin.

In practicing the present invention, the methylolation and condensation reactions common to the synthesis of PF resins can be conducted at a temperature and over a time period commonly encountered during the synthesis of conventional PF resins. The time and temperature of the PF resin synthesis of the present invention is not narrowly critical and in the broadest aspects of the present invention the variety of synthesis approaches for making PF resole resins should be suitable. For example, the reaction can proceed in stages such that in an initial stage the reactions proceed at a temperature in the range from 50 to 80° C., and preferably in the range of 57-80° C. In a second phase, the reaction generally is allowed to proceed at a temperature of about 100° C., e.g., at or approaching reflux. Finally, the completion of the methylolation and condensation reactions common to the synthesis of PF resole resins may proceed at a temperature in the range from 60 to 80° C. in a third stage. Typically, the reactions are allowed to proceed for a sufficient time such that the free formaldehyde content in the resole resin reaction product is within the range of 0.2 to 18% by weight and the free phenol content is less than 1.5% of the aqueous resin.

While all of the reactants can be introduced into the aqueous mixture before the necessary alkalinity and reaction temperature are established, it is within the broad aspects of the present invention to provide a stage-wise or programmed addition of the reactants, including the sulfite source. For example, the sulfite source, such as an alkali metal sulfite, could be added to an aqueous reaction mixture of the phenol component and formaldehyde. Generally, it is preferred that some portion of the sulfite source be present at the initiation of the methylolation and condensation reactions, however. Preferably, the PF resin is prepared by introducing the phenol component and the sulfite source (along with any alkaline material that may be needed to establish a sufficient pH for the resole reactions) into an aqueous reaction medium, increasing the temperature to that desired for the ensuing reactions and then adding the formaldehyde in separate stages. In this embodiment, it is preferred that the first charge of formaldehyde constitute at least about 0.8 mole formaldehyde per mole of phenol component, with latter additions of formaldehyde increasing the F:P mole ratio to above 1:1 (i.e., a molar excess of formaldehyde).

In a preferred embodiment, when using an alkali metal sulfite as the sulfite source, an initial reaction is conducted between the sulfite source and a portion of the total formaldehyde charge used to prepare the resole resin (preferably at least about 0.8 mole of formaldehyde per mole of the total charge of phenol component). For example, when using sodium sulfite as the sulfite source, an aqueous solution of the full complement of the phenol component and the sodium sulfite is first established. Thereafter, an initial portion of the formaldehyde (preferably at least about 0.8 mol formaldehyde per mole of phenol component) is added which initiates reactions between the formaldehyde and the sodium sulfite, creating a source of alkalinity, as well as initiating the methylolation of the phenol component. The temperature is raised, typically to approach reflux conditions (about 100° C.), for a time sufficient to promote the sulfonation of the formaldehyde. Thereafter, the temperature is reduced and the remaining formaldehyde is added (to establish a molar excess of formaldehyde relative to the phenol component) as further methylolation and condensation reactions lead to a reduction in the free phenol content of the reaction solution as the resole resin synthesis proceeds. This technique is illustrated in the attached Examples.

In order to promote the synthesis of methylolated phenolic species of improved aqueous solubility and minimize the generation of tertradimer, it is important that an amount of the sulfite source be added sufficient to establish a molar ratio of sulfite ($-SO_3$) to phenol in the range of about 0.02 to 0.6 mole of sulfite (S) to phenol (P) in the aqueous reaction mixture. Preferably, when using an alkali metal sulfite, such as sodium sulfite as the sulfite source, the S:P mole ratio is generally in the range of about 0.05:1 to 0.3:1. When using other sulfite sources, such as sodium bisulfite or the sodium salt of hydroxymethyl sulfonic acid, the S:P mole ratio is more typically established in the range of 0.05:1 to 0.5:1.

In accordance with the present invention, the alkalinity in the aqueous reaction mixture can be established, at least in part, by the addition of an alkali metal sulfite as the sulfite source. In the broad practice of the present invention, an amount of a sulfite source, such as an alkali metal sulfite, and any additional alkaline material sufficient to establish a pH in the aqueous reaction mixture of at least about 8.0 and preferably in the range of about 8.5 to 11.0 is added to the aqueous reaction mixture. Still other permutations for bringing the phenol component, the formaldehyde and the sulfite source, such as an alkali metal sulfite, together for the methylolation and condensation reactions will be recognized by those skilled in the art. Generally, when an alkali metal sulfite is used as the sulfite source, it alone should be sufficient to establish the desired level of alkalinity. Nevertheless, the addition of other inorganic sources of alkalinity, such as alkali metal hydroxides, and/or organic sources of alkalinity, such as trimethylamine or triethylamine, is within the purview of the present invention.

Usually, the synthesis of the PF resin is conducted in a way to provide an aqueous resin with total solids of about 35 to 60 percent by weight and usually 40 to 50 percent by weight. The aqueous PF resin typically includes an amount of residual or "free" formaldehyde, such as up to about 18% by weight of the aqueous resin (usually based on a resins solids content of about 50%) and also a small amount of residual "free" phenol, such as up to about 1.5% by weight of the aqueous resin. Generally it is preferred to keep the residual "free" formaldehyde of the resin to less than about 12% by weight, and the residual "free" phenol to less than 0.75% by weight.

In some embodiments, the aqueous alkaline mixture containing the PF resin can optionally be neutralized by the addition of an acidic material following its preparation. Exemplary of acidic materials that can be used for this neutralization are sulfamic acid, sulfuric acid, formic acid, acetic acid, boric acid, phosphoric acid, their salts and the mixtures thereof. When used, the aqueous alkaline mixture containing the PF resin generally is acidified to a neutral pH, such as to a pH in the range from about 5 to 8 and more usually to a pH of about 7.

Before the PF resin of the present invention is used for making a fibrous product such as fiberglass insulation, it is commonly premixed with a formaldehyde scavenger, usually urea, and the urea is allowed to react with residual "free" formaldehyde, such as for 4-16 hours, before a binder formulation, e.g. a fiberglass insulation binder, is prepared from the urea-extended resin by dilution with additional water and the addition of other known adjuvants. The resulting urea-extended product is referred to herein as a PFU resin and alternatively as a premix. The present invention also is directed to such a "premix."

In the broad practice of the present invention, the premix may include the PF resin of the present invention and at least one other component, such as urea, ammonia, or another nitrogenous reagent, for reaction with residual formaldehyde in the binder in order to further reduce the free formaldehyde content of the resin and accordingly formaldehyde emissions from the subsequently formulated binder when it is used. For example, a premix can be prepared by mixing the PF resin, urea and optionally ammonia. In another embodiment, a high nitrogen-containing cyclic urea urea-formaldehyde prepolymer of the type described in U.S. Pat. No. 6,114,491 (the entire disclosure of which is incorporated herein by reference) can be used for extending the PF resin.

Preferably, a premix is prepared by mixing from 50 to 80 parts of the PF resin (on resin solids basis), with from 20 to 50 parts urea (on a urea solids basis), and from 0 to 6 parts ammonia (on an ammonia solids basis), and then adding sufficient water to adjust the premix solids to 30 to 50% total solids. Generally, the premix is stirred under gentle agitation for about 4 to 16 hours prior to use in formulating a binder. When using the cyclic urea-formaldehyde prepolymer identified above 50 to 80 parts of the PF resin (on a resin solids basis) can be mixed with from 20 to 50 parts of the cyclic urea-formaldehyde prepolymer.

The conventional process for extending a PF resin with urea is applicable to the PF resins of this invention. The specific features of such procedures are well known to those skilled in the art and need not be detailed any further herein.

One advantage of the present invention is that such PFU resins (as well as resins extended with the above-noted cyclic urea-formaldehyde prepolymer) made with the PF resin of low tetra content of the present invention have a surprisingly improved stability relative to extended (e.g., PFU) resins prepared from conventional sodium hydroxide-catalyzed PF resins made for fiberglass insulation binder applications. In particular, PFU resins made from conventional PF resins generally have a rather limited shelf life. Once a PF resin has been "pre-reacted" with urea, which significantly reduces its free formaldehyde content, the premix generally must be used within a relatively short time period (preferably 12-24 hours). After this time period, the premix tends to start losing water dilutability and may begin to precipitate solids. This aging phenomenon may result in undesired discard of the premix, which results in waste and increased costs.

Because of the enhanced stability of the PFU resin and the cyclic urea-formaldehyde prepolymer extended resin of the present invention, such extended resins can be manufactured long before the intended use of the extended resin for formulating a binder, such as a fiberglass insulation binder, without experiencing the solids precipitation problem that confronts a PFU resin made from a conventional PF resin. Thus, when using a resole resin made in accordance with the present invention, it is no longer necessary for the fiberglass manufacturer to prepare the extended resin, such as a PFU resin, on-location at the fiberglass manufacturing facility, and the related equipment and storage capacity that would otherwise have to be devoted to that production can now be avoided.

Instead, armed with the present invention, the resin manufacturer can prepare both the base PF resin and then the extended resin such as a urea-extended, or PFU resin or premix directly, shipping the extended resin, such as the PFU resin or premix, directly to the fiberglass insulation manufacturer. At this point, the fiberglass insulation manufacturer need only dilute the extended resin to the desired solids concentration and add any other optional additives, such as silanes, lignins, dedusting oils, carbon black, dyes and the like, to the extended resin to produce a fully formulated binder suitable for making the non-woven mat, such as in the production of fiberglass insulation.

The PF and extended (e.g., PFU) resins of the present invention exhibit an infinite water dilutability, i.e., the resins of the present invention can be diluted with water without forming precipitated solids. As used herein, a resin is considered to exhibit an infinite water dilutability when it can be diluted 50:1, water to resin, with no development of haze or precipitation of solids. This infinite dilutability is an important property for resins to be used in formulating binders for fibrous products.

The PF resins and PFU resins of the present invention have particular utility in the formulation of binder compositions for making non-woven mats, such as fiberglass insulation. Many patents and other documents describe general fiberglass production processes, the techniques of which form no part of the present invention. In this regard, the reader is referred to U.S. Pat. No. 5,952,440, which contains a detailed description of the history and the state of the art relating to fiberglass manufacturing technology, and for that reason this patent is incorporated in its entirety herein by reference.

In particular, binder compositions and the resulting non-woven fiber products made using the binders, such as fiberglass insulation, generally may be prepared as follows. First, the phenol-formaldehyde (PF) resin material of the present invention, as described in detail elsewhere in this specification, is produced. This PF resin is used as a starting material to produce a binder by mixing the resin with urea or with a cyclic urea-formaldehyde prepolymer to produce an extended resin, such as a urea-extended or PFU resin. The binder also generally contains a latent acid catalyst, such as an ammonium salt of a strong acid, as well as additional diluent water, to reduce the total solids content of the binder generally to less than about 20% by weight, and other conventional binder ingredients and adjuvants.

Once produced, the binder can be applied to a fiber base material (e.g., by spraying). After the binder is dried and cured on the fiber base material, the product can be sized and/or shaped into a desired final configuration (if necessary). Alternatively, the steps of drying and final curing can be separated and the resulting dried fibrous product can be stored for an extended time period (e.g., several hours to two months or more), after which time the binder is cured. The sizing and/or shaping can also occur at any time, e.g., before, during, and/or after the storage and/or drying and/or curing steps. The present invention is not limited to any particular procedure for making a fiber product.

The curing times and temperatures for binder composition made using the PF and PFU resins of the present invention are the same as those commonly employed for resole resins generally and curing temperatures are usually within the range from 50 to 300° C., and preferably within the range from 90 to 230° C. and curing times will usually be somewhere between 3 seconds to about 15 minutes. Of course, other temperatures and times can be used depending upon particular binder formulations and the present invention is not limited to any specific set of conditions.

It will be understood that while the invention has been described in conjunction with specific embodiments thereof, the foregoing description and following examples are intended to illustrate, but not limit the scope of the invention. Other aspects, advantages and modifications will be apparent to those skilled in the art to which the invention pertains, and these aspects and modifications are within the scope of the invention.

EXAMPLE 1

A reaction mixture was established by charging phenol (about 1040 parts by weight ppw)), water (about 226 ppw) and sodium sulfite (about 305 ppw) into a suitable reaction vessel. The mixture was warmed to 57° C. Formaldehyde (about 532 ppw of an approximately 50% by weight aqueous solution) was added to the reaction mixture over 25 minutes and the reaction mixture was allowed to exotherm to 80° C. After the addition of the first formaldehyde charge, the mixture was warmed to about 100° C. and held there for 60 minutes. After the hold period, the mixture was cooled to 80° C. and an additional formaldehyde charge (about 1094 ppw of the approximately 50% by weight aqueous solution) was added to the reaction mixture over 30 minutes. The reaction was monitored by following the concentration of free phenol in the mixture. At a free phenol content of about 0.7% by weight, the mixture was cooled towards 25° C. During the cooling, a third quantity of formaldehyde (about 850 ppw of the approximately 50% by weight aqueous solution) was added.

The resulting PF resin had a total solids content of about 47%, a free formaldehyde content of about 12.6% by weight and a free phenol content of about 0.3% by weight.

EXAMPLE 2

A reaction mixture was established by charging phenol (about 1040 parts by weight (ppw)), water (about 226 ppw) and sodium sulfite (about 305 ppw) into a suitable reaction vessel. The mixture was warmed to 57° C. Formaldehyde (about 532 ppw of an approximately 50% by weight aqueous solution) was added to the reaction mixture over 25 minutes and the reaction mixture was allowed to exotherm to 80° C. After the addition of the first formaldehyde charge, the mixture was warmed to about 100° C. and held there for 60 minutes. After the hold period, the mixture was cooled to 80° C. and an additional formaldehyde charge (about 1094 ppw of the approximately 50% by weight aqueous solution) was added to the reaction mixture over 30 minutes. The reaction was monitored by following the concentration of free phenol in the mixture. At a free phenol content of about 0.7% by weight, the mixture was cooled towards 25° C.; and a third quantity of formaldehyde (about 721 ppw of the approximately 50% by weight aqueous solution) was added.

The resulting PF resin had a total solids content of about 50%, a free formaldehyde content of about 11.4% by weight and a free phenol content of about 0.6% by weight.

The free formaldehyde was reduced by adding about 60 pbw urea to the PF resin, which reduced the free formaldehyde to about 9% by weight. Then, about 50 pbw of sulfamic acid was added to neutralize the pH from about 9.7 to about 9.2. The resulting resin solution had a tetra content of 5-7% by weight and exhibited a water dilutability of over 50:1.

EXAMPLE 3

A reaction mixture was established by charging phenol (about 1104 parts by weight (ppw)), water (about 475 ppw) and sodium sulfite (about 324 ppw) into a suitable reaction vessel. The mixture was warmed to 57° C. Formaldehyde (about 1126 ppw of an approximately 50% by weight aqueous solution) was added to the reaction mixture over 25 minutes and the reaction mixture was allowed to exotherm to 80° C. After the addition of the first formaldehyde charge, the mixture was warmed to about 100° C. and held there for 60 minutes. After the hold period, the mixture was cooled to 80° C. and an additional formaldehyde charge (about 867 ppw of the approximately 50% by weight aqueous solution) was added to the reaction mixture over 30 minutes. The reaction was monitored by following the concentration of free phenol in the mixture. At a free phenol content of about 0.5% by weight, the mixture was cooled towards 25° C.

The resulting PF resin had a total solids content of about 54% and a free phenol content of about 0.5% by weight. The tetra content of the resin was about 5-7% by weight of the resin solution.

EXAMPLE 4

A reaction mixture was established by charging phenol (about 1236 parts by weight (ppw)), water (about 532 ppw) and sodium sulfite (about 181.5 ppw) into a suitable reaction vessel. The mixture was warmed to 57° C. Formaldehyde (631 ppw of an approximately 50% by weight aqueous solution) was added to the reaction mixture over 25 minutes and the reaction mixture was allowed to exotherm to 80° C. After the addition of the first formaldehyde charge, the mixture was warmed to 100° C. and held there for 60 minutes. After the hold period, the mixture was cooled to 80° C. and an additional formaldehyde charge (about 1420 ppw of the approximately 50% by weight aqueous solution) was added to the reaction mixture over 30 minutes. The reaction was monitored by following the concentration of free phenol in the mixture. At a free phenol content of about 0.7% by weight, the mixture was cooled towards 25° C.

The resulting PF resin had a total solids content of about 50.3% and a free phenol content of about 0.6% by weight. The tetradimer content in the resin was about 7.2% by weight of the resin solution.

EXAMPLE 5

To a 1000 g sample of resin from EXAMPLE 1 was added 588 g of a urea solution (40% by weight urea in water), The resin and urea were mixed for 30 minutes and left to allow the urea to prereact with the free formaldehyde. The resulting resin solution had less than about 0.4% free formaldehyde and was stable for more than 30 days without precipitation. The water dilutability of the resin was greater than 50:1.

EXAMPLE 6

To a 1800 g sample of resin of EXAMPLE 2 was added 398 g of urea and 597 g of water. The mixture was stirred until all urea was dissolved. The resulting resin solution had a less than about 0.4% free formaldehyde and was stable for more than 30 days without precipitation. The water dilutability of the resin was greater than 50:1.

EXAMPLE 7

A reaction mixture was established by charging phenol (497 parts by weight (ppw)), water (114 ppw) sodium bisulfite (120 ppw) and sodium hydroxide (92 ppw at a 50% solids concentration) into a suitable reaction vessel. The mixture was warmed to 57° C. Formaldehyde (about 245 ppw of an approximately 50% by weight aqueous solution) was added to the reaction mixture over 25 minutes and the reaction mixture was allowed to exotherm to 80° C. After the addition of the first formaldehyde charge, the mixture was warmed to about 100° C. and held there for 60 minutes. After the hold period, the mixture was cooled to 80° C. and an additional formaldehyde charge (552 ppw of the approximately 50% by weight aqueous solution) was added to the reaction mixture over 30 minutes. The reaction was monitored by following the concentration of free phenol in the mixture. At a free phenol content of 0.8% the reaction was cooled to 61° C. followed by an additional charge of 400 parts by weight of formaldehyde (50% by weight aqueous solution). The mixture was cooled towards 25° C. when the free phenol content in the mixture reached 0.6%. The PF resin product had a tetra content of 7.4%

EXAMPLE 8

A reaction mixture was established by charging phenol (565 parts by weight (ppw)), water (200 ppw) and the sodium bisulfite-formaldehyde addition compound (the sodium salt of hydroxymethyl sulfonic acid—172 ppw) and 90 parts of caustic (sodium hydroxide) at 50% solids into a suitable reaction vessel. Te mixture was warmed to 57° C. Formaldehyde (207 ppw of an approximately 50% by weight aqueous solution) was added to the reaction mixture over 25 minutes and the reaction mixture was allowed to exotherm to 80° C. After the addition of the first formaldehyde charge, the mixture was warmed to about 100° C. and held there for 60 minutes. After the hold period, the mixture was cooled to 80° C. and an additional formaldehyde charge (567 ppw of the approximately 50% by weight aqueous solution) was added to the reaction mixture over 30 minutes. The reaction was monitored by following the concentration of free phenol in the mixture. At a free phenol content of about 2.6% the reaction was cooled to 61° C. followed by an additional charge of 445 parts by weight of formaldehyde (approximately 50% by weight aqueous solution). The mixture was cooled towards 25° C. when the free phenol content in the mixture reached about 0.6%

The tetra content in the resin product was 8.2% and the free formaldehyde was at 8.8%.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification (other than the EXAMPLES) and in the claims the term "about" is intended to encompass + or −5%.

We claim as follows:

1. A method of making a phenol-formaldehyde resin suitable for use in preparing a binder composition where a molar excess of formaldehyde (F) is reacted with a phenol component (P), the method comprising reacting formaldehyde (F) with the phenol component (P) under an alkaline condition in the presence of a sulfite source, the sulfite source being present in an amount to provide 0.02 to 0.6 mole sulfite per mole of phenol and wherein a first portion of formaldehyde, sufficient to establish a molar ratio of formaldehyde to phenol component of above about 0.8:1 but less than a molar excess of formaldehyde, is reacted with phenol in the presence of the sulfite source and then a second portion of formaldehyde is added to establish the molar excess of formaldehyde for further reaction.

2. The method of claim 1 wherein the mole ratio of formaldehyde to phenol component (F:P) in the phenol-formaldehyde resin is in the range of 1.1:1 to 6:1.

3. The method of claim 1 wherein the sulfite source is selected from the group consisting of an alkali metal sulfite, an alkali metal bisulfite, an alkali metal metabisulfite, an alkali metal salt of hydroxymethyl sulfonic acid and mixtures thereof.

4. The method of claim 3 wherein the sulfite source is an alkali metal sulfite present in an amount to provide 0.05:1 to 0.3:1 mole sulfite per mole phenol.

5. The method of claim 3 wherein the sulfite source is selected from the group consisting of an alkali metal bisulfite, an alkali metal metabisulfite, an alkali metal salt of hydroxymethyl sulfonic acid and mixtures thereof present in an amount to provide 0.05:1 to 0.5:1 mole sulfite per mole phenol.

6. The method of claim 1 wherein the alkaline condition is established in part using a separately added source of alkalinity.

7. The method of claim 6 wherein the source of alkalinity is selected from the group consisting of an alkali metal hydroxide, an alkaline earth metal hydroxide, an organic base and mixtures thereof.

8. The method of claim 7 wherein the alkali metal hydroxide is selected from the group consisting of sodium hydroxide, potassium hydroxide, lithium hydroxide and mixtures thereof wherein the alkaline earth metal hydroxide is selected from the group consisting of calcium hydroxide, barium hydroxide and mixtures thereof, and the organic base is selected from the group consisting of trimethylamine, dimethyl ethanolamine and mixtures thereof.

9. The method of claim 1 wherein the reaction with the first portion of formaldehyde is allowed to proceed at a temperature of up to 100° C., while the reaction with the second portion of formaldehyde is allowed to proceed at a temperature of up to 80° C.

10. A phenol-formaldehyde resin suitable for use in preparing a binder composition prepared by the method of claim 1.

11. An extended phenol-formaldehyde resin prepared by mixing a phenol-formaldehyde resin with an extender selected from the group consisting of (1) urea, (2) a mixture of urea and ammonia, (3) a cyclic urea-formaldehyde prepolymer and (4) mixtures thereof, followed by reacting the extender with the phenol-formaldehyde resin, wherein the phenol-formaldehyde resin has been prepared by reacting a molar excess of formaldehyde (F) with a phenol component under an alkaline condition in the presence of a sulfite source, the sulfite source being present in an amount to provide 0.02 to 0.6 mole sulfite per mole of phenol.

12. The extended phenol formaldehyde resin of claim 11 wherein the phenol-formaldehyde resin is provided in an amount of 80 to 50 parts by weight resin solids to conversely 20 to 50 parts by weight of extender solids.

13. A binder formulation prepared by diluting the extended phenol-formaldehyde resin of claim 11 with water.

14. A binder formulation prepared by diluting the extended phenol-formaldehyde resin of claim 12 with water.

15. A method for binding together a loosely associated mat of fibers comprising (1) contacting said fibers with an aqueous binder composition comprising the phenol-formaldehyde resin of claim 10 and (2) heating said aqueous binder composition to an elevated temperature sufficient to cure said resin.

16. A method for binding together a loosely associated mat of fibers comprising (1) contacting said fibers with an aqueous binder composition comprising the extended phenol-formaldehyde resin of claim 11 and (2) heating said aqueous binder composition to an elevated temperature sufficient to cure said resin.

17. A method for binding together a loosely associated mat of fibers comprising (1) contacting said fibers with the binder formulation of claim 13 and (2) heating said binder formulation to an elevated temperature sufficient to cure.

18. A nonwoven fiber mat prepared by the method of claim 15.

19. A nonwoven fiber mat prepared by the method of claim 16.

20. A nonwoven fiber mat prepared by the method of claim 17.

21. A phenol-formaldehyde resin suitable for use in preparing a binder composition prepared by the method of claim 9.

22. An extended phenol-formaldehyde resin prepared by mixing the phenol-formaldehyde resin of claim 10 with an extender selected from the group consisting of (1) urea, (2) a mixture of urea and ammonia, (3) a cyclic urea-formaldehyde prepolymer and (4) mixtures thereof, followed by reacting the extender with the phenol-formaldehyde resin.

23. A binder formulation prepared by diluting the extended phenol-formaldehyde resin of claim 22 with water.

24. A method for binding together a loosely associated mat of fibers comprising (1) contacting said fibers with an aqueous binder composition comprising the phenol-formaldehyde resin of claim 21 and (2) heating said aqueous binder composition to an elevated temperature sufficient to cure said resin.

25. A method for binding together a loosely associated mat of fibers comprising (1) contacting said fibers with an aqueous binder composition comprising the extended phenol-formaldehyde resin of claim 22 and (2) heating said aqueous binder composition to an elevated temperature sufficient to cure said resin.

26. A method for binding together a loosely associated mat of fibers comprising (1) contacting said fibers with the binder formulation of claim 23 and (2) heating said binder formulation to an elevated temperature sufficient to cure.

27. A nonwoven fiber mat prepared by the method of claim 24.

28. A nonwoven fiber mat prepared by the method of claim 25.

29. A nonwoven fiber mat prepared by the method of claim 26.

* * * * *